United States Patent [19]

Peschi

[11] Patent Number: 5,548,593

[45] Date of Patent: Aug. 20, 1996

[54] RESEQUENCING METHOD AND RESEQUENCING DEVICE REALIZING SUCH A METHOD

[75] Inventor: Robert N. L. Peschi, Schaerbeek, Belgium

[73] Assignee: Alcatel N. V., Rijswijk, Netherlands

[21] Appl. No.: 265,388

[22] Filed: Jun. 24, 1994

[30] Foreign Application Priority Data

Jun. 29, 1993 [EP] European Pat. Off. .............. 93201896

[51] Int. Cl.$^6$ .................................................. H04L 12/56

[52] U.S. Cl. ............................................ 370/94.1; 370/60

[58] Field of Search ......................... 370/94.1, 60, 60.1, 370/94.3, 94.2, 61, 110.1, 58.1, 58.2, 58.3; 340/825.02

[56] References Cited

U.S. PATENT DOCUMENTS

| 5,127,000 | 6/1992 | Henrion | 370/60 |
|---|---|---|---|
| 5,173,897 | 12/1992 | Schrodi et al. | 370/94.1 |
| 5,202,885 | 4/1993 | Schrodi et al. | 370/94.1 |
| 5,319,360 | 6/1994 | Schrodi et al. | 370/94.1 |

FOREIGN PATENT DOCUMENTS 8900941  8/1989  WIPO .

OTHER PUBLICATIONS

"Multicasting to Multiple Groups over Broadcast Channels", I. Gopal et al, Computer Networking Symposium, Apr. 1988, Washington USA, as reported in *IEEE* 1988, pp. 79–81.

"Switched Multi-megabit Data Service and Early Availability via MAN Technology", C. Hemrick et al, *IEEE Communications Magazine*, vol. 26, No. 4, Apr. 1988, pp. 9–14.

"Sequence Number Synchronization in the ATM Adaptation Layer", C. da Costa et al, Mediterranean Electrotechnical Conference, vol. 1, May 1991, New York, as reported in IEEE 1991, pp. 505–508.

Patent Abstracts of Japan, vol. 005, No. 011 (E–042), 23Jan.1981 and J–A–55 140 347 (OKI Electric Inc. Co. Ltd., pub. 1Nov.1980.

*Primary Examiner*—Douglas W. Olms
*Assistant Examiner*—Dang Ton
*Attorney, Agent, or Firm*—Ware, Fressola, Van Der Sluys & Adolphson

[57] ABSTRACT

The resequencing device resequences information packets of an information stream transmitted from a transmitter station (IWU1) to a receiver station (IWU2) over a network (SMDS). This information stream includes first packets which may be received in the receiver station out of sequence with respect to each other or with respect to second packets which are always received in sequence. The network is for instance a Switched Multimegabit Data Service network where the first packets have a group address and are transmitted from the transmitter station to the receiver station and to other receiver stations (IWU2, IWU3) belonging to the same group, and the second packets have an individual address and are transmitted from the transmitter station to the receiver station. The transmitter station includes a counter circuit (C1) providing a counter value and a processing circuit (P1) which assigns the counter value to the second packets and the counter value incremented by one to the first packets. In this way the sequence numbers of the first packets form an ascending monotonic series and the second packets have sequence numbers equal to the sequence number of the preceding first packet. Based thereon the packets can easily be resequenced by a second processing circuit (P2) located in the receiver station, and which therefor uses a second counter circuit (C2), a timer (T) and a buffer (B).

21 Claims, 1 Drawing Sheet

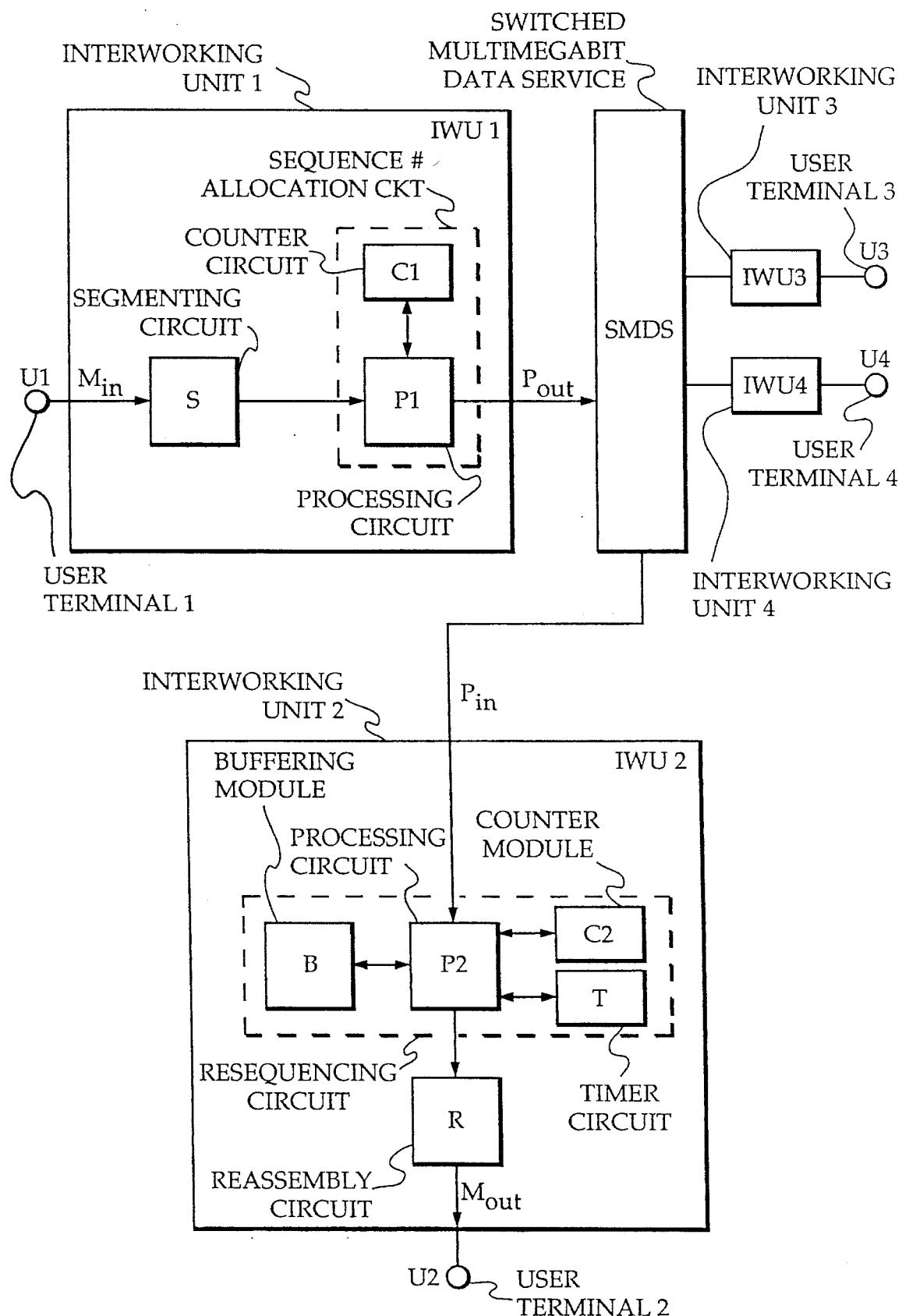

RESEQUENCING METHOD AND RESEQUENCING DEVICE REALIZING SUCH A METHOD

The present invention relates to a method for resequencing information packets of an information packet stream transmitted from a transmitter station to a receiver station over a network and identified by sequence numbers.

BACKGROUND OF THE INVENTION

Such a method is well known in the art, e.g. from the Euro-PCT Application No. 89908985.8 corresponding to U.S. Pat. No. 5,127,000 to Henrion. Therein, the network is a multipath self routing switch, so that packets may follow different paths therein and may therefore be out of sequence upon their arrival in the receiver station. In this station the packets are then resequenced based on sequence numbers constituted by time stamps allocated to them in the transmitter station.

This known resequencing method is however not applicable when the information packet stream comprises two or more types of intermixed packets which have to be in sequence in the receiver station, not only within each type they belong to but also with respect to each other. This is for instance the case with a so called Switched Multimegabit Data Service (SMDS) network as described in the Bellcore specifications TR-TSV-000772 (corresponding CCITT Draft Recommendation I364, Geneva, June 1992 or ETSI final draft pr ETS 300217 September 1992) and wherein packets belonging to a same information stream also called session or message can be transmitted either as first packets with group addresses from the transmitter station to a plurality of receiver stations, including a predetermined receiver station, via arbitrary paths, which means that they can be received out of sequence in the latter receiver station, or as second packets with individual adresses from the transmitter station to the predetermined receiver station where they are then received in sequence. As all these packets, i.e. as well the first as the second ones, belong to a same information stream, the first packets have to be resequenced in the predetermined receiver station to be in sequence not only with respect to themselves, but also with respect to the second packets. Resequencing these first and second packets with the help of sequence numbers or time stamps allocated thereto as in known systems has the important drawback that it is impossible to know upon receipt of a sequence of first and second packets whether packets have been lost, and thus whether one has to wait for those possibly lost packets.

Indeed, the transmitter station which is not aware to which message a packet belongs, has to sequentially allocate sequence numbers/time stamps to the packets it sends out, without taking into account to which message these packets belong. As a result, the packets received by a receiver station are not numbered consecutively because first packets are sent to all receiver stations, while second packets are sent to specific ones. Considering for instance a transmitter station which has to send 10 packets numbered 1 to 10 of which packets 1 to 3 are first packets, 4 to 6 are second packets intended for a first receiver station, 7 and 8 are second packets intended for a second receiver station and 9 and 10 are first packets, the first station then receives packets 1 to 6, 9 and 10 and the second station receives packets 1 to 3, and 7 to 10. The packets received are thus not numbered consecutively and it is impossible for the receiver stations to know whether the gaps in the numbering are due to packet loss or not.

To be noted that the above reasoning is also applicable to time stamps.

DISCLOSURE OF INVENTION

An object of the present invention is to provide a resequencing method of the above known type but which is more particularly applicable when the information packet stream includes first packets which may be received in said receiver station out of sequence with respect to each other or with respect to second packets which are always received in sequence, and which has not got the above mentioned drawback.

According to the invention, this object is achieved due to the fact that in the latter case said method includes the steps of:

in said transmitter station, allocating predetermined first sequence numbers to said first packets and allocating to each second packet following a first packet a second sequence number which is related according to a predetermined relation to the predetermined first sequence number allocated to this first packet; and in said receiver station, resequencing said first and second packets according to their first and second sequence numbers respectively.

By linking the sequence numbers of the first and the second packets, and allocating predetermined first sequence numbers to the first packets an easy resequencing is possible and a receiver station always knows whether, upon receipt of a packet, it has to wait for a previous one not yet received.

Further characteristics of the invention are that said allocated predetermined first sequence numbers form an increasing/decreasing monatonic series and that said second sequence number allocated to said second packet is equal to the predetermined first sequence number of the first packet preceding said second packet.

This choice of the predetermined first sequence numbers and of the predetermined relation makes the resequencing even easier due to this simple relationship between the first packets with respect to each other and between the first and the second packets.

Known resequencing devices realizing the known resequencing methods are obviously restricted in the same way as described above with relation to the known resequencing methods.

The present invention therefore also relates to a resequencing device for resequencing information packets of an information packet stream transmitted from a transmitter station to a receiver station over a network and identified by sequence numbers characterized in that, when said information packet stream includes first packets which may be received in said receiver station out of sequence with respect to each other or with respect to second packets which are always received in sequence, said resequencing device includes:

a sequence number allocation means located in said transmitter station and which is able to allocate predetermined first sequence numbers to said first packets and to allocate to each second packet following a first packet a second sequence number which is related according to a predetermined relation to the predetermined first sequence number allocated to this first packet; and a resequencing means located in said receiver station and which is able to resequence said first and second packets according to their first and second sequence numbers respectively, which realizes the new resequencing method.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE shows a communication system which includes a resequencing device according to the present invention and which realizes a resequencing method also according to the present invention.

BEST MODE FOR CARRYING OUT THE INVENTION

This communication system includes a Switched Multimegabit Data Service network SMDS to which 4 user terminals U1 to U4 are coupled via respective identical interworking units IWU1 to IWU4 of which only IWU1 and IWU2 are partly represented in detail. More specifically, of IWU1 a segmenting circuit S for segmenting a message Min received from U1, a processing circuit P1 and a counter circuit C1 are shown, and of IWU2 a processing circuit P2 is shown together with a counter module C2, a buffering module B, a timer circuit T and a reassembly circuit R for reassembling packets Pin received from P2, into a message Mout destined for U2.

C1 and P1 together constitute a sequence number allocation circuit and P2, C2, B and T are part of a resequencing circuit, both circuits constituting a sequencing device.

C1 and C2 are wrap-around counters, i.e. counters which after having reached a maximum value automatically restart counting from their initial value.

P1 and P2 control C1 and C2 respectively and retrieve respective counter values therefrom.

P2 is additionally connected to B and T by means of bidirectional links.

S passes to P1 packets obtained by segmenting a message Min and in response P1 generates outgoing packets Pout for transfer over SMDS. Therein these packets are routed to e.g., IWU2 where they are received by P2 as incoming packets Pin. The latter are after processing and possible buffering passed to R for reassembly into Mout.

C1, S, P1, B, P2, R, T and C2 are not described in further detail because, for a person skilled in the art, their realization is obvious from their following functional description.

Packets belonging to a same message or information flow can be transmitted over SMDS in two ways, i.e., as packets of a first type, hereafter called first packets, having a group destination address and which are sent to all interworking units belonging to a corresponding group, e.g. IWU1 to IWU4 and as packets of a second type, hereafter called second packets, having an individual destination address and which are transmitted from point to point, e.g. from IWU1 to IWU2. Individual address packets or second packets are hereafter indicated by Ix where x is the sequence number of the packet in the message it belongs to, and in the same way group address packets or first packets are called Gx.

It has to be noted that the counter module C2 includes as many counter circuits as there are interworking units which can send first packets to it, but for simplicity reasons it is assumed that C2 only includes a single counter circuit allocated to the first packets received from IWU1. Extension to a counter module with a plurality of counter circuits is obvious to a person skilled in the art.

P1 sets C1 to an initial value, e.g. 0, at start-up of the sequence number allocation circuit. Whenever a packet is afterwards received from S for transmission over SMDS, P1 gets the current counter value provided by C1 and assigns it to that packet when it is a second packet. On the contrary, when the received packet is a first packet then P1 increments C1 by a predetermined value, e.g. 1, and assigns the thus obtained value to that packet. As a result, second packets always have the same sequence number as the preceding first packet, except for second packets sent immediately after start-up of the sequence allocation circuit. These packets indeed have sequence number 0 while there is no preceding first packet with value 0.

At the receiving side, e.g. IWU2, and upon start-up of the resequencing circuit, C2 is set by P2 to the initial value of C1 by means of a synchronization scheme. Synchronization schemes as the one used in this embodiment are well known in the art and therefore the used scheme is not described in detail. As will become clear from the following, the value of C2 at a given instant in time indicates the sequence number of the first packet which was the last one to be passed to R, and its value incremented by 1 indicates which first packet is expected to be received next.

To be noted that the maximum value of C1 and C2 at which the wrap-around occurs has to be the same one for both and that this maximum value has to be chosen in such a way, that the receiver station never has to process two or more first packets with the same sequence number at the same time.

When a packet Pin is received in IWU2, P2 compares its sequence number with the current counter value provided by C2.

If this sequence number is higher than the value of C2, in case of a second packet, or than the value of C2 incremented by 1 when a first packet is received, then P2 stores the packet Pin in B because this means that as well in case of a first packet as in case of a second packet at least one preceding first packet has still to be received. Obviously, the number of first packets still to be received depends on the difference between the value of C2+1 and the sequence number of the received packet. In other words, the number of still expected packets is equal to the sequence number of the received packet minus the value of C2+1.

P2 starts a timer, by using T, for each buffered packet. When one of these timers expires it is supposed that all still to be received first packets with sequence number smaller than the sequence number of the packet for which that timer was started are lost and the packet for which the timer has expired is, together with all buffered first packets having a sequence number lower than that for which the timer has expired and with all related buffered second packets, sequenced in the following way before transmission to R: all packets are ordered in ascending order, with the second packets interleaved with the first packets in such a way that the second packets always follow the first packets with the same sequence number if present and that the sequence of receipt of the second packets is preserved. C2 is then set by P2 to a value equal to the sequence number of the packet of which the timer has expired. The reason for this procedure is that according to a requirement of the system the packets may not stay in the system for longer than a predefined time interval equal to the maximum transmission delay.

If the received packet is a first packet and its sequence number is equal to the counter value C2+1, P2 checks if there are buffered packets. If so, all buffered first packets the sequence numbers of which, with the sequence number of the received packet, form an increasing series with increment value one are retrieved from the buffer together with all second packets having a sequence number equal to the sequence number of the received packet or of one of the retrieved packets. All these packet are then ordered as described earlier. Each time a first packet is passed to R, P2 increments C2 by one and cancels a possible timer started for that packet. If, no packets are buffered or if the buffered first packets do not form the mentioned increasing series with the received packet, only the latter is passed to R and C2 is incremented by 1. It has then to be checked whether there are no buffered second packets which have then to be retrieved and passed to R in the sequence they were received.

Upon receipt of a second packet with sequence number equal to the value of C2, P2 passes this packet to R, since this means that the preceding first packet was already received and passed to R.

Packets received by P2 and having a lower sequence number than the value of C2 in case of second packets or than the value of C2+1 in the case of first packets are discarded. This is correct since in case of a second packet this means that the packet was overtaken by a first packet, whereas in the case of a first packet this means that the received packet was supposed to be lost due to a previous time out.

To illustrate the above described procedure it is now applied to a transmitted packet stream I0, I0, G1, G2, G3, I3, I3, G4, G5, G6, I6, I6, I6, G7, I7 which is after start-up of the resequencing circuit received by P2 as I0, G1, I0, G2, G3, I3, I3, G5, G4, I6, I6, G6, I6, G7, I7. The letter I refers to second packets and the letter G refers to first packets. The numbers following the letters refer to sequence numbers.

After a generally known synchronization procedure C2 is set to an initial value of 0 by P2. Upon receipt of I0 by P2, the latter transmits I0 to R. When G1 is received its sequence number is compared with the value of C2 which is 0. This indicates that the next to be received first packet has to have sequence number one and consequently G1 is passed to R. Thereafter it is checked if there are no buffered packets, and C2 is incremented to 1, which means that the next expected first packet has sequence number 2. The following packet I0 is discarded because it has a sequence number lower than the value of C2 and was thus overtaken by G1. G2 has a sequence number corresponding to the next to receive sequence number and is thus passed by P2 to R. Thereafter B is checked for possible buffered packets, and C2 is incremented to 2. The same applies to G3 and C2 is incremented to 3. The two following packets I3, I3 are second packets the sequence number of which is equal to the value of C2 which means that the preceding first packet had sequence number 3 and as a consequence the packets are passed to R. When G5 is received P2 detects that it is not the following expected first packet which has a sequence number equal to the value of C2+1=4. G5 is therefore buffered and a timer is started for G5 by T under control of P2. It is assumed that G4 is received before the timer has reached a predetermined value corresponding to the maximum transmission delay in the network. Since the sequence number of G4 corresponds to the value of the next expected first packet, i.e. C2+1, P2 checks if there are packets buffered and retrieves G5 from B. The timer is stopped and the received and the retrieved packets are sequenced as G4, G5 and transmitted to R, whilst C2 is twice incremented to become 5. Had the timer expired before G4 was received, then G4 would have supposed to be lost and G5 would have been retrieved from B and transmitted to R and C2 would then have put equal to 5 by P2.

When the packets I6, I6 are received, P2 detects that these are second packets and thus should have a sequence number corresponding to the value of C2, i.e. 5. Since this is not true and because their sequence number is higher, they are buffered and G6 is expected. Upon receipt of G6, P2 finds out it is a first packet which should have the value of C2 30 1, i.e. 6. Since this is the case P2 checks if there are no packets buffered, retrieves I6, I6 from B and sends the packets to R in the sequence G6, I6, I6. C2 is incremented to 6. The then received packet I6 is passed to R because C2 equals 6. Since C2 has value 6, P2 expects as following first packet G7,which is therefore passed to R. It is checked whether there are packets buffered and C2 is incremented. I7 is then passed to R because its sequence number has the same value as C2, which means that a previous first packet with sequence number 7 was received.

It has to be noted that the above method can be applied in a similar way when the increment value is greater than 1, or for decrements with a predetermined value. Also another relationship can be chosen between the sequence numbers of the second packets and the preceding first packet.

It has also to be noted that, since messages can also be transmitted from IWU2 to IWU1, a sequence allocation circuit and a resequencing circuit such as those of IWU1 and IWU2 are also present in IWU2 and IWU1 respectively.

While the principles of the invention have been described above in connection with specific apparatus, it is to be clearly understood that this description is made only by way of example and not as a limitation on the scope of the invention.

I claim:

1. Method for resequencing information packets of an information packet stream (Min) transmitted from a transmitter station (IWU1) to a receiver station (IWU2) over a network (SMDS) and identified by sequence numbers, characterized in that, when said information packet stream (Min) includes first type packets of a multicast packet type which are received in said receiver station both in and out of sequence with respect to each other or with respect to second type packets of a point-to-point packet type which are always received in sequence, said method including the steps of:

in said transmitter station, allocating predetermined first sequence numbers in a monotonic series to said first type packets and allocating to each one of said second type packets following a packet of said first type packets a second sequence number which is related according to a predetermined relation to a predetermined first sequence number allocated to said packet of said first type packets by adding/subtracting to/from a value of a previously allocated first sequence number fixed, predetermined value; and in said receiver station, resequencing said first type packets and said second type packets according to their first and second sequence number respectively.

2. Method according to claim 1, characterized in that said second sequence number allocated to a first one of said second type packets is equal to the predetermined first sequence number of the first packet preceding said first one of said second type packets.

3. Method according to claim 1, characterized in that a packet of said second type packets is discarded in said receiver station (IWU2) when its said second sequence number is smaller/greater than the predetermined first sequence number of a previously received packet of said first type packets.

4. Method according to claim 1, characterized in that in said receiver station, a packet of said second type packets which has a second sequence number which is larger/smaller than the predetermined first sequence number of a previously received packet of said first type packets is stored in a buffer as a buffered packet until receipt of a packet of said first type packets having a predetermined first sequence number equal to said second sequence number of said buffered packet.

5. Method according to claim 1, characterized in that upon receipt in said receiver station (IWU2) of a packet of said first type packets from said transmitter station (IWU1) said packet is buffered when its predetermined first sequence number is larger/smaller than the sequence number of a last previously received and not buffered packet of either said first type packets or said second type packets incremented/decremented by said predetermined value, that upon receipt by said receiver station a packet of said second type packets from said transmitter station, said packet is buffered when its second sequence number is larger/smaller than the sequence number of the last previously received and not buffered packet of either said first type packets or said second type packets, that upon receipt by said receiver station of a packet for output of said second type packets with said second sequence number equal to the sequence number of the last previously received and not buffered packet of either said first type packets or said second type packets, or of a packet for output of said first type packets with said predetermined first sequence number equal to the sequence number of the last previously received and not buffered packet of either said first type packets or said second type packets incremented/decremented by said predetermined value, said packet for output upon receipt is passed to an output terminal (R) of said receiver station, those already buffered packets of said first type packets, the first sequence numbers of which together with the sequence number of the passed first packet form part of said monotonic series also being passed to said output terminal, in ascending/descending order of their first sequence number, together with those second packets having a second sequence number equal to a previously passed packet of either said first type packets or said second type packets and that upon receipt of a packet for discard of said second type packets having said second sequence number smaller/larger than the sequence number of the last previously received and not buffered packet of either said first type packets or said second type packets or of a packet for discard of said first type packets having said predetermined first sequence number smaller/larger than the sequence number of the last previously received and not buffered packet of either said first type packets or said second type packets incremented/decremented by said predetermined value, said packet for discard upon receipt is discarded.

6. Method according to claim 5, characterized in that a timer is started for each one of said buffered packets all buffered packets with sequence number smaller/greater than the sequence number of said one packer, and all buffered packets with sequence number greater/smaller than the sequence number of said one packet and which form with said one packet part of said monotonic series, being passed to said output terminal after having been sequenced to form a series of packets related to said monotonic series in a predetermined way, when said timer reaches a predetermined value.

7. Method according to claim 1, characterized in that a predetermined initial value is assigned to the second sequence number of all second packet which are transmitted before the transmission of any first packet.

8. Method according to claim 2, characterized in that a packet of said second type packets is discarded in said receiver station (IWU2) when its said second sequence number is smaller/greater than the predetermined first sequence number of a previously received packet of said first type packets.

9. Method according to claim 2, characterized in that in said receiver station, a packet of said second type packets which has a second sequence number which is larger/smaller than a predetermined first sequence number of a previously received packet of said first type packets is stored in a buffer as a buffered packet until receipt of a packet of said first type packets having a predetermined first sequence number equal to said second sequence number of said buffered packet.

10. Method according to claim 2, characterized in that upon receipt in said receiver station (IWU2) of a packet of said first packets from said transmitter station (IWU1) said packet is buffered When its predetermined first sequence number is larger/smaller than the sequence number of last previously received and not buffered packet of either said first type packets or said second type packets: incremented/decremented by said predetermined value, that upon receipt by said receiver station of a packet of said second type packets from said transmitter station, said packet is buffered when its second sequence number is larger/smaller than the sequence number of the last previously received and not buffered packet of either said first type packets or said second type packets, that upon receipt by said receiver station of a packet of said second type packets with said second sequence number equal to the sequence number of the last previously received and not buffered packet of either said first type packets or said second type packets, or of a packet of said first type packets with said predetermined first sequence number equal to the sequence number of the last previously received and not buffered packet of either said first type packets or said second type packets incremented/decremented by said predetermined value, said packet upon receipt is passed to an output terminal (R) of said receiver station, those already buffered packets of said first type packets, the first sequence numbers of which together with the sequence number of the passed first packet form part of said monotonic series also being passed to said output terminal, in ascending/descending order of their first sequence number, together with those second packets having a second sequence number equal to a previously passed packet of either said first type packets or said second type packets and that upon receipt of a packet of said second type packets having said second sequence number smaller/larger than the sequence number of the last previously received and not buffered packet of either said first type packets or said second type packets or of a packet of said first type packets having said predetermined first sequence number smaller/larger than the sequence number of the last previously received and not buffered packet of either said first type packets or said second type packets incremented/decremented by said predetermined value, said packet upon receipt is discarded.

11. Method according to claim 10, characterized in that a timer is started for each one of said buffered packets, all buffered packets with sequence number smaller/greater than the sequence number of said one packet, and all buffered packets with sequence number greater/smaller than the sequence number of said one packet and which form with said one packet part of said monotonic series, being passed to said output terminal after having been sequenced to form a series of packets related to said monotonic series in a predetermined way, when said timer reaches a predetermined value.

12. Resequencing device for resequencing information packets of an information packet stream (Min) transmitted from a transmitter station (IWU1) to a receiver station (IWU2) over a network (SMDS) and identified by sequence numbers characterized in that, when said information packet stream (Min) includes first type packets of a multicast packet type which are received in said receiver station both in and out of sequence with respect to each other or with respect to second type packets of a point-to-point packet type which are always received in sequence, said resequencing device including:

a sequence number allocation means (P1, C1) located in said transmitter station (IWU1) and which is able to allocate predetermined first sequence numbers in a monotonic series to said first type packets and to allocate to each second type packet following a packet of said first type packets a second sequence number which is related according to a predetermined first sequence number allocated to said packet of said first type packets by adding/subtracting to/from a value of a previously allocated first sequence number a fixed, predetermined value; and a resequencing means (P2, B, C2, T) located in said receiver station (IWU2) and which is able to resequence said first and second type packets according to their first and second sequence numbers respectively.

13. Resequencing device according to claim 12, characterized in that said second sequence number allocated to each one of said second type packets is equal to the predetermined first sequence number of said packet of said first type packets following by said each one.

14. Resequencing device according to claim 13, characterized in that said sequence number allocation means includes a counter means (C1) providing a counter value and a processing means (P1) which assigns said counter value to packets of said second type packets to be transmitted and controls said counter means to be incremented/decremented by a predetermined value before assigning said counter value to packets of said first type packets to be transmitted.

15. Resequencing device according to claim 12, characterized in that said resequencing device includes a buffering means (B) to buffer received packets of said second type packets having a same second sequence number which is larger/smaller than the sequence number of the last previously received and not buffered packet of either said first type packets or said second type packets until receipt of a packet of said first type packets having a predetermined first sequence number equal to the second sequence number of the buffered packets of said second type packets.

16. Resequencing device according to claim 14, characterized in that said resequencing device includes at least one second counter means (C2) providing a second counter value the initial value of which is at start-up of said resequencing means made equal to the initial value of said first counter and a second processing means (P2) which upon receipt of a packet of said first type packets from said transmitter station (IWU1) buffers said packet in said buffering means when its predetermined first sequence number is larger/smaller than said counter value incremented/decremented by said predetermined value, which upon receipt of a packet of said second type packets from said transmitter station (IWU1) buffers said packet in said buffering means when its second sequence number is larger/smaller than said counter value, which upon receipt of a packet of said second type packets with a second sequence number equal to said counter value or of a packet of said first type packets with a predetermined first sequence number equal to said counter value incremented/decremented by said predetermined value, passes said packet upon receipt to an output terminal of said resequencing means and controls said second counter means to be incremented/decremented by said predetermined value when a packet of said first type packets is passed to said output terminal, those already buffered packets of said first type packets the first sequence numbers of which together with the first sequence number of the passed packet form part of said monotonic series and those packets of said second type packets having a second sequence number equal to the sequence number of either the passed or of one of those buffered packets of said first type packets then also being passed to said output terminal in such a way that those buffered packets of said first type packets are sequenced in ascending/descending order of their sequence number, together with buffered packets of said second type packets sequenced in such a way with respect to said passed packets of said first type packets that they follow a packet of said first type packets having the same predetermined first sequence number as their own second sequence number, and which upon receipt of a packet of said second type packets having a second sequence number smaller/larger than said counter value or of a packet of said first type packets having a predetermined first sequence number smaller/larger than said counter value incremented/decremented by said predetermined value, discards said packet upon receipt.

17. Resequencing device according to claim 16, characterized in that said resequencing device includes a timer means (T) controlled by said second processing means (P2) to start a timer for each one of said buffered packets, all buffered packets with sequence number smaller/greater than the sequence number of said one packet, and all buffered packets with sequence number greater/smaller than the sequence number of said one packet and which form with said one packet part of said monotonic series, being passed to said output terminal after having been sequenced to form a series of packets related to said monotonic series in a predetermined way, when said timer reaches a predetermined value.

18. Resequencing device according to claim 12, characterized in that in said network (SMDS) said second packets have an individual destination address and are sent from said transmitter station (IWU1) to said receiver station (IWU2) and said first packets have a group destination address and are sent from said transmitter station (IWU1) to said receiver station (IWU2) and to at least one other receiver station (IWU3, IWU4).

19. Resequencing device according to claim 13, characterized in that said sequence number allocation means includes a counter means (C1) providing a counter value and a processing means (P1) which assigns said counter value to said packets of second type packets to be transmitted and controls said counter means to be incremented/decremented by a predetermined value before assigning said counter value to packets of said first type packets to be transmitted.

20. Resequencing device according to claim 13, characterized in that said resequencing device includes a buffering means (B) to buffer received packets of said second type packets having a same second sequence number which is larger/smaller than the sequence number of the last previously received and not buffered packet of either said first type packets or said second type packets until receipt of a packet of said first type packets having a predetermined first sequence number equal to the second sequence number of the buffered packets of said second type packets.

21. Resequencing device according to claim 15, characterized in that said resequencing device includes at least one second counter means (C2) providing a second counter value the initial value of which is at start-up of said resequencing means made equal to the initial value of said first counter and a second processing means (P2) which upon receipt of a packet of said first type packets from said transmitter station (IWU1) buffers said packet in said buffering means when its predetermined first sequence number is larger/smaller than said counter value incremented/decremented by said predetermined value, which upon receipt of a packet of said second type packets from said transmitter station (IWU1) buffers said packet in said buffering means when its second sequence number is larger/smaller than said counter value, which upon receipt of a packet of said second type packets with a second sequence number equal to said counter value or of a packet of said first type packets with a predetermined first sequence number equal to said counter value incremented/decremented by said predetermined value, passes said packet upon receipt to an output terminal of said resequencing means and controls said second counter means to be incremented/decremented by said predetermined value when a packet of said first type packets is passed to said output terminal, those already buffered packets of said first type packets the first sequence numbers of which together with the first sequence number of the passed packet form part of said monotonic series and those packets of said second type packets having a second sequence number equal to the sequence number of either the passed or of one of those buffered packets of said first type packets then also being passed to said output terminal in such a way that those buffered packets of said first type packets are sequenced in ascending/descending order of their sequence number, together with buffered packets of said second type packets sequenced in such a way with respect to said passed packets of said first type packets that they follow a packet of said first type packets having the same predetermined first sequence number as their own second sequence number, and which upon receipt of a packet of said second type packets having a second sequence number smaller/larger than said counter value or of a packet of said first type packets having a predetermined first sequence number smaller/larger than said counter value incremented/decremented by said predetermined value, discards said packet upon receipt.

* * * * *

UNITED STATES PATENT AND TRADEMARK OFFICE
CERTIFICATE OF CORRECTION

PATENT NO. : 5,548,593
DATED : August 20, 1996
INVENTOR(S) : Peschi

It is certified that error appears in the above-indentified patent and that said Letters Patent is hereby corrected as shown below:

Column 7, line 56 (claim 6), "packets all"
should read --packets, all--

Column 7, line 58 (claim 6), "one packer"
should read --one packet--

Signed and Sealed this

Twenty-ninth Day of October 1996

*Attest:*

BRUCE LEHMAN

*Attesting Officer*     *Commissioner of Patents and Trademarks*